United States Patent [19]

Wakayama et al.

[11] Patent Number: 4,624,797
[45] Date of Patent: Nov. 25, 1986

[54] MAGNETIC FLUID AND PROCESS FOR PREPARING THE SAME

[75] Inventors: Katsuhiko Wakayama; Hiraku Harada, both of Tokyo, Japan

[73] Assignee: TDK Corporation, Tokyo, Japan

[21] Appl. No.: 775,357

[22] Filed: Sep. 12, 1985

[30] Foreign Application Priority Data

Sep. 17, 1984 [JP] Japan .................................. 59-194321
Sep. 18, 1984 [JP] Japan .................................. 59-194985

[51] Int. Cl.$^4$ .......................... C09D 5/23; C10M 3/44; H01F 1/25
[52] U.S. Cl. ............................. 252/62.52; 252/62.51; 252/62.55
[58] Field of Search ................ 252/62.52, 62.51, 62.55

[56] References Cited

U.S. PATENT DOCUMENTS

| 3,764,540 | 10/1973 | Khalafalla et al. | 252/62.52 |
| 3,917,538 | 11/1975 | Rosensweig | 252/62.52 |
| 4,315,827 | 2/1982 | Bottenberg | 252/62.52 |
| 4,356,098 | 10/1982 | Chagnon | 252/62.53 |
| 4,430,239 | 2/1984 | Wyman | 252/62.52 |

OTHER PUBLICATIONS

Ito et al., Chem. Abstracts, 87 (1977), #145014.
Winkler et al., Chem. Abstracts, 86 (1977), #132462.
Mehta et al., J. Mag. & Mag. Mat., 39 (1983), pp. 35–38.

Primary Examiner—Arthur P. Demers
Attorney, Agent, or Firm—Oblon, Fisher, Spivak, McClelland & Maier

[57] ABSTRACT

A magnetic fluid comprising metal fine particles of cobalt, a nonionic or oil-soluble anionic surface-active agent, and a low-volatile solvent exhibits remarkably high saturation magnetization.

19 Claims, 1 Drawing Figure

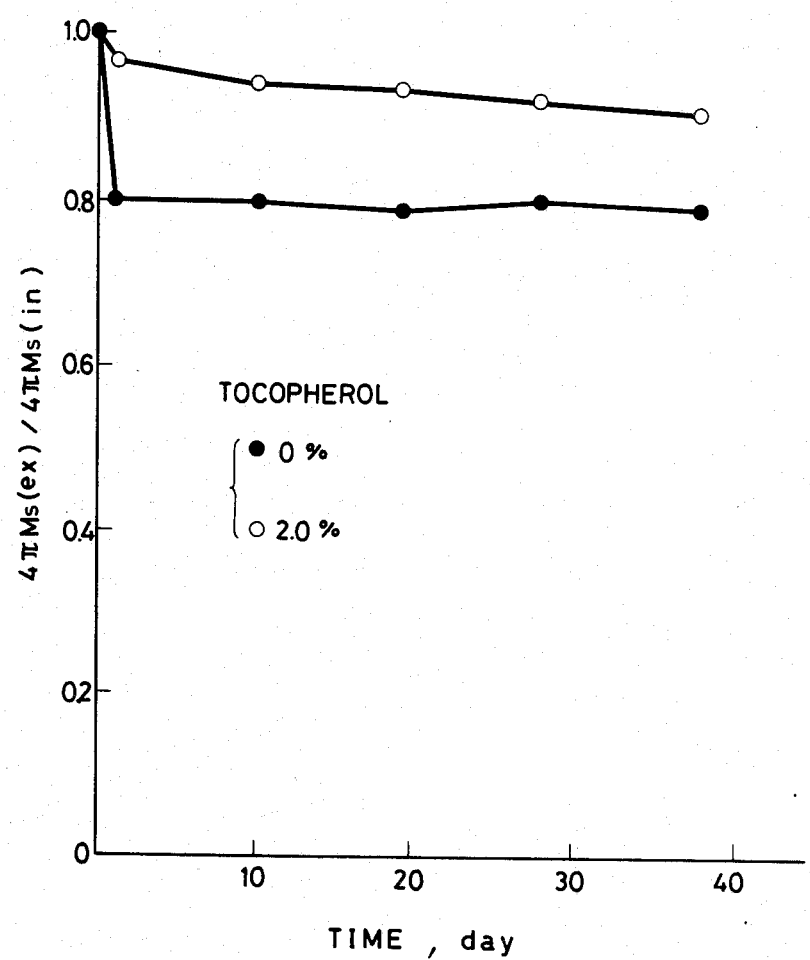

MAGNETIC FLUID AND PROCESS FOR PREPARING THE SAME

CROSS REFERENCE TO RELATED APPLICATION

Reference is made to our copending application Ser. No. 760,469 for Magnetic Fluid, filed July 30, 1985, which was assigned to the same assignee as the present invention and incorporated herein by reference.

BACKGROUND OF THE INVENTION

This invention relates to magnetic fluid and process for preparing the same.

Among magnetic fluids are known colloidal dispersions of fine particles of magnetic oxide material, typically magnetite ($Fe_3O_4$) pretreated with a surface-active agent in oil or water. Such magnetic fluids have been utilized in a variety of applications.

As is well know in the art, magnetic fluids often find applications as sealing materials for sealing of rotary shafts or the like. In these applications of magnetic fluids, it is often required that the mediums be low volatile, thermally stable and lubricant. Fatty acid mono- and di-esters as well as polyphenyl oil are well-known mediums which meet the above requirements. In fact these mediums have been used for producing magnetic fluids with magnetic oxide materials dispersed therein.

However, no attempt has been successfully made in producing magentic fluids meeting the above requirements by dispersing magnetic particles in the form of metal fine particles which themselves have high saturation magnetization.

If magnetic fluids can be produced by dispersing a high concentration of metal fine particles in the above mentioned mediums, such magentic fluids which have increased saturation magnetization and superior thermal stability would find a wider variety of applications.

Metal fine particles in these magnetic fluids are expected to be oxidized with a probable reduction in saturation magnetization.

SUMMARY OF THE INVENTION

It is, therefore, an object of the present invention to provide a novel and improved magnetic fluid comprising metal fine particles of cobalt dispersed in a low-volatile medium and having an outstandingly higher saturation magnetization than prior art magnetic fluids.

Another object of the present invention is to provide such a magnetic fluid characterized by controlled oxidation as well as increased saturation magnetization.

Still another object of the present invention is to provide a process for preparing such a magnetic fluid by dispersing metal fine particles of cobalt in a low volatile medium.

These and other objects can be achieved by the present invention which is directed to a magnetic fluid comprising metal fine particles of cobalt, a surface-active agent, and a medium.

According to a first aspect of the invention, the surface-active agent comprises a nonionic surface-active agent or oil-soluble anionic surface-active agent, and the medium is a low-volatile solvent.

According to a second aspect of the invention, the surface-active agent comprises a nonionic surface-active agent or oil-soluble anionic surface-active agent and the medium comprises a low-volatile solvent and a low-boiling solvent.

According to a third aspect of the invention, there is provided a process for preparing a magnetic fluid comprising metal fine particles of cobalt, a surface-active agent, and a medium, comprising the steps of:

preparing a dispersion comprising metal fine particles of cobalt, a surface-active agent and a low-boiling solvent; and replacing all or a part of the low-boiling solvent by a low-volatile solvent having a nonionic or oil-soluble anionic surface-active agent dissolved therein.

In one preferred embodiment of the present invention, the magnetic fluid further contains an antioxidant for preventing oxidation of metal fine particles.

BRIEF DESCRIPTION OF THE DRAWING

FIG. 1 is a diagram showing the saturation magnetization ratio of aged fluid to fresh fluid as a function of time.

DETAILED DESCRIPTION OF THE INVENTION

The present invention is directed to a magnetic fluid comprising metal fine particles of cobalt. Since ferromagnetic fine particles must be dispersed in liquid, cobalt metal must be first finely divided into discrete particles of a sufficient particle size to overcome their magnetic cohesive force. The cobalt metal fine particles used in the practice of the present invention have an average particle size of 70 to 120 Å.

The mediums used in the magnetic fluid according to the present invention should meet such properties as low volatility, thermal stability and lubricity for practical uses. Low-volatile solvents are thus selected, preferably having a boiling point of at least 150° C. at 1 mmHg. The preferred solvents are diesters and saturated aliphatic hydrocarbons alone or in admixture as they are effective in improving dispersion.

Preferred diester solvents are diesters of dicarboxylic acids, especially, di-esters of saturated aliphatic dicarboxylic acids having 6 to 10 carbon atoms alone or in admixture of two or more. These diesters are shown by the general formula [I].

$$ROOC(CH_2)_nCOOR \qquad [I]$$

where n is an integer between 4 and 8. Among preferred saturated aliphatic dicarboxylic acids are adipic acid (n=4), azelaic acid (n=7) and sebacic acid (n=8). In formula [I], R represents a saturated aliphatic hydrocarbon residue having 3 to 10 carbon atoms, and most preferably, 8 carbon atoms, namely, octyl groups including 2-ethylhexyl group.

The preferred diester solvents used in the practice of the invention include (i) dioctyl adipate, (ii) dioctyl azelate, and (iii) dioctyl sebacate alone or mixtures of two or more. The diester solvents are present in amounts of 50 to 300% by weight based on the weight of the metal fine particles.

Instead of or in addition to the diester solvents, at least one saturated aliphatic hydrocarbon solvent may be used. The saturated aliphatic hydrocarbons may preferably have 19 to 30 carbon atoms, and their preferred examples include:

(i) pristane
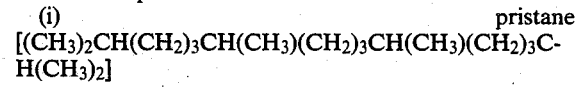
$[(CH_3)_2CH(CH_2)_3CH(CH_3)(CH_2)_3CH(CH_3)(CH_2)_3CH(CH_3)_2]$ (ii) squalane
[(CH$_3$)$_2$CH(CH$_2$)$_3$CH(CH$_3$)(CH$_2$)$_3$CH(CH$_3$)CH$_2$CH$_2$]$_2$ (iii) α-olefin oligomers

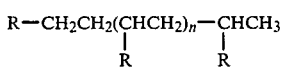

wherein n is an integer between 1 and 4, and preferably 1 or 2, and R is an alkyl group having 2 to 12 carbon atoms, preferably about 6, e.g. Syncelane 30 manufactured by Nikkoh Chemicals K.K.

The total amount of one or more saturated aliphatic hydrocarbon solvents and optional diester solvents ranges from 50 to 300% by weight based on the weight of the metal fine particles.

The magnetic fluid according to this invention may contain one or more low-boiling solvents in addition to the above-mentioned low-volatile (high-boiling) solvents. The low-boiling solvents may preferably have a boiling point of about 100° to 160° C., and the preferred solvents are hydrocarbon solvents.

The hydrocarbons used as the dispersion medium in the practice of the present invention may preferably have 7 to 22 carbon atoms and include paraffinic and olefinic hydrocarbons such as kerosine, and aromatic hydrocarbons such as toluene, xylene, etc. The hydrocarbon solvent is present in amounts of 0 to 5% by weight or more based on the weight of the metal fine particles.

It is necessary to prevent flocculation of fine particles due to van der Waals force. In the prior art, magnetic oxide particles are chemically coated with a polar surface-active agent to prevent flocculation by the repulsion of particles to each other. However, no such coating agent has been discovered for metal base magnetic fluids.

We have discovered that a nonionic surface-active agent or oil-soluble anionic surface-active agent can effectively assist in the stable dispersion of metal fine particles. More particularly, the nonionic surface-active agent used in the present invention is at least one member selected from the group consisting of polyglycerine fatty acid esters and polyethylene glycol alkyl ethers having the general formulas [II] and [III], respectively.

[II] Polyglycerine fatty acid esters:

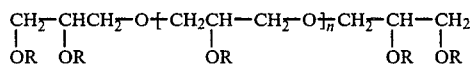

R is individually hydrogen or an acyl group derived from an unsaturated fatty acid, and n is a positive integer inclusive of zero. When R stands for acyl, plural R radicals may be different, but generally the same. For the polyglycerine fatty acid esters, the polyglycerine may preferably have a degree of polymerization of 2 to 10, that is, n=0 to 8. More preferably, n is an integer between 4 and 8.

Illustrative examples of the polyglycerine fatty acid esters used as the surface-active agent in the invention include:

(1) decaglyceryl pentaoleate,
(2) decaglyceryl heptaoleate,
(3) decaglyceryl decaoleate,
(4) hexaglyceryl pentaoleate,
(5) tetraglyceryl pentaoleate, and
(6) diglyceryl dioleate.

[III] Polyethylene glycol alkyl ethers:

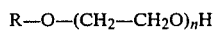

R is an unsaturated alkyl group, and n is preferably selected from 1 to 3. Commercially available polyethylene glycol alkyl ethers are usually mixtures of those with different degrees of polymerization.

Illustrative examples of the polyethylene glycol alkyl ethers used as the surface-active agent in the invention include:

(1) dioxyethylene oleyl ether,
(2) Noigen ET69 (manufactured by Daiichi Kogyo Phermaceutical K.K., polyethylene glycol oleyl ether prepared by incorporating 2.3 mol of ethylene glycol per mol of oleyl alcohol), and
(3) Noigen ET89 (manufactured by Daiichi Kogyo Phermaceutical K.K., polyethylene glycol oleyl ether prepared by incorporating 3.8 mol of ethylene glycol per mol of oleyl alcohol).

The preferred oil-soluble anionic surface-active agents used in the present invention are sulfosuccinates which are shown by the general formula [IV].

where R is a saturated aliphatic hydrocarbon group, and preferably octyl groups having 8 carbon atoms such as 2-ethylhexyl group, and Y represents either an alkaline metal such as Na and K, or hydrogen.

Mixtures of two or more of the foregoing surface-active agents may also be used according to the present invention, and the total amount of the surface-active agents added to the fluid is about 5 to 20% by weight based on the weight of the metal fine particles. Amounts of less than 5% by weight are ineffective in promoting dispersion. The fluids become paste to inhibit dispersion when the surface-active agent is present in excess of 20% by weight.

The magnetic fluids of the present invention may further contain an effective amount of an antioxidant for preventing oxidation of cobalt particles. The antioxidants used herein may be conventional oil-soluble antioxidants.

Tocopherols are preferred among others. The most preferred tocopherol is D,L-α-tocopherol having the general formula [V]:

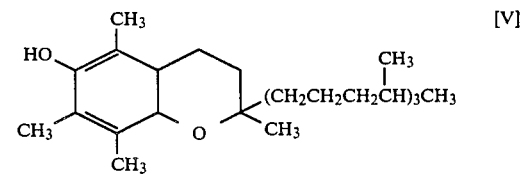

In addition, β-tocopherol, γ-tocopherol, δ-tocopherol, and d-α-tocopherol may also be used.

The antioxidants may be used in amounts of 0.8 to 10% by weight of the weight of the metal fine particles. Less than 0.8% of the antioxidant is ineffective whereas more than 10% of the antioxidant will adversely affect magnetic properties.

The magnetic fluids of the present invention may be prepared by dissolving the surface-active agent and optionally, the antioxidant in the low-boiling hydrocarbon solvent, adding a metal carbonyl to the medium, and heating the mixture to thereby thermally decompose the metal carbonyl. The metal carbonyl used herein may be cobalt carbonyl as expressed by $Co_2(CO)_8$ although not limited thereto. Thermal decomposition may be effected at a temperature of 140° to 160° C. for about 2 to 4 hours. The temperature and time may be suitably chosen in accordance with the concentration of cobalt and the type of hydrocarbon solvent. The surface-active agent added to the solvent may preferably be polyglycerine or sorbitan fatty acid esters as disclosd in copending U.S. patent application Ser. No. 760,469. The amount of the low-boiling solvent is 50 to 250% of the weight of cobalt, while the amount of the surface-active agent is 25 to 60% of the weight of cobalt.

The above procedure results in a dispersion of cobalt fine particles in the low-boiling solvent with the aid of the surface-active agent.

Then all or a part of the low-boiling solvent in the dispersion is replaced by a low-volatile solvent having a nonionic or oil-soluble anionic surface-active agent dissolved therein. The amount of the low-volatile solvent and the proportion of the nonionic or oil-soluble anionic surface-active agent therein are as stated in the foregoing.

Solvent replacement is conducted by causing the cobalt fine particles dispersed in the low-boiling solvent to agglomerate. Agglomeration may be achieved by distilling off the solvent, but usually by adding another solvent having different polarity than the dispersing medium. For example, for the hydrocarbon solvent such as kerosine and xylene, acetone may be added in an amount of about one-half of that of the hydrocarbon solvent. Dioxane may also be used for this purpose. Thereafter substantially all the solvents are removed. The remaining cobalt agglomerated is added to a low-volatile solvent having a nonionic or oil-soluble anionic surface-active agent dissolved therein, and then dispersed again in the medium by means of an ultrasonic washing machine, for example.

The final dispersion of cobalt fine particles does not usually contain the initially added low-boiling solvent and surface-active agent. However, the final dispersion may sometimes contain the low-boiling solvent and surface-active agent initially added although the amount of the low-boiling solvent should preferably be below 5% by weight, and the amount of the initially added surface-active agent be below 2% by weight based on the weight of the metal fine particles.

The thus prepared magnetic fluid must be stored in a suitable sealed container. The interior of the container is preferably purged with an inert gas such as argon and nitrogen.

The magnetic fluid of the present invention has the advantages of improved dispersion and saturation magnetization over prior art magnetic fluids because metal fine particles of cobalt possessing increased saturation magnetization are dispersed in a low-volatile solvent with the aid of a nonionic or oil-soluble anionic surface-active agent.

Moreover, the use of a low-volatile solvent as the medium offers practical benefits in that the medium has improved properties including low volatility, thermal stability and lubricity.

These benefits are achievable through solvent replacement, which is a simple operation.

The addition of the antioxidant retards oxidation of metal fine particles which is otherwise accompanied by saturation magnetization reduction.

EXAMPLES

In order that those skilled in the art will better understand how to practice the present invention, examples are given below by way of illustration and not by way of limitation.

EXAMPLE 1

Into a three-necked flask fitted with a reflux condenser, thermometer, and stirrer was admitted 12 grams of deca-glyceryl heptaoleate in 30 grams of kerosin medium. To this solution was added 120 grams of octacarbonyl dicobalt $Co_2(CO)_8$.

With stirring, the mixed solution was gradually heated up to about 150° C. with the aid of a mantle heater. Heating under reflux caused the cobalt carbonyl to thermally decompose. The decomposition gas CO emitted from the top of the condenser. The emission of CO gas was confirmed by passing the gas into a $PdCl_2$ solution in 1/1 acetone/water. Introduction of CO gas turned the palladium chloride solution from orange to black. After CO emission subsided, stirring was continued for an additional 30 minutes. Upon cooling, there was obtained a black solution.

The black solution was centrifuged at 6,000 rpm for one hour. There was observed little separation or settlement. The fine particles in the solution were measured to have an average particle size of 70 Å.

Acetone was then added to the resultant cobalt magnetic fluid to cause the cobalt fine particles to agglomerate.

After removal of the solvents, each low-volatile solvent as specified in Table 1 and having 10% of deca-glyceryl heptaoleate dissolved as a surface-active agent was added to the residue. The cobalt fine particles were dispersed again in the solvent by means of an ultrasonic washing machine.

The thus prepared dispersion was centrifuged at 16,000 rpm for twenty minutes to inspect dispersion, and then put into a rotary evaporator in an oil bath at 160° C. The initially added solvent was completely removed within 30 minutes. After cooling, the dispersion was again centrifuged to confirm stable dispersion.

The magnetic fluids were kept in good dispersion when their concentration was varied by controlling the amount of the high-boiling solvent.

Table 1 shows the saturation magnetization (4 $\pi$Ms/G) of the magnetic fluids, using their specific gravity as a parameter instead of concentration.

TABLE 1

| Medium | Specific gravity | 4 $\pi$ Ms/G |
|---|---|---|
| Squalane | 1.3424 | 917 |
| Syncelane 30 | 1.5117 | 1503 |

EXAMPLE 2

The procedure of Example 1 was repeated except that kerosine medium was replaced by xylene. Syncelane 30 was used as the low-volatile solvent.

The fluid had a specific gravity of 1.3421 and a saturation magnetization of 1250 G.

EXAMPLE 3

The procedure of Example 1 was repeated except that decaglyceryl heptaoleate was replaced by dioxyethylene oleyl ether as the surface-active agent in re-dispersing the cobalt fine particles. Syncelane 30 was used as the low-volatile solvent.

The fluid had a specific gravity of 1.3985 and a saturation magnetization of 1362 G.

EXAMPLE 4

The procedure of Example 1 was repeated except that decaglyceryl heptaoleate was replaced by 2-ethylhexyl sulfosuccinate and that the low-volatile solvents as given in Table 2 were used.

TABLE 2

| Medium | Specific gravity | 4 π Ms/G |
|---|---|---|
| Squalane | 1.3461 | 1496 |
| Squalane | 1.6595 | 1695 |
| Dioctyl azelate | 1.2918 | 1250 |
| Dioctyl adipate | 1.2928 | 918 |
| Dioctyl sebacate | 1.2453 | 900 |

EXAMPLE 5

To the fluid of Example 4 containing squalane solvent and having a specific gravity of 1.3461 and saturation magnetization of 1496 G was added D,L-α-tocopherol antioxidant in an amount of 2.0% based on the weight of cobalt particles. The antioxidant-free fluid of Example 4 and the antioxidant-containing fluid of this example were aged upon exposure to atmosphere to examine how their saturation magnetization varied with the lapse of time. The aging variation is expressed by the ratio of the saturation magnetization Ms(ex) at a point of measurement to the initial saturation magnetization Ms(in) of freshly prepared magnetic fluid (t=0). The results are shown in FIG. 1.

As seen from FIG. 1, the addition of D,L-α-tocopherol in an amount of 2.0% based on the weight of cobalt particles prevents the reduction of saturation magnetization at the end of about 40 days as compared with the antioxidant-free fluid.

What is claimed is:

1. A magnetic fluid comprising metal fine particles of cobalt, a surface-active agent selected from the group consisting of an oil-soluble anionic sulfosuccinate surface-active agent and a nonionic surface-active agent which is a polyglycerine fatty acid ester or polyethylene glycol alkyl ether, and a low-volatile solvent medium.

2. A magnetic fluid according to claim 1 wherein the metal fine particles have an average particle size of 70 to 120 A.

3. A magnetic fluid according to claim 1 wherein the low-volatile solvent has a boiling point of at least 150° C. at 1 mmHg.

4. A magnetic fluid according to claim 1 wherein the low-volatile solvent is at least one member selected from ester and hydrocarbon solvents.

5. A magnetic fluid according to claim 4 wherein the ester solvent is a diester of a saturated aliphatic dicarboxylic acid.

6. A magnetic fluid according to claim 5 wherein the saturated aliphatic dicarboxylic acid has 6 to 10 carbon atoms.

7. A magnetic fluid according to claim 4 wherein the hydrocarbon solvent is a saturated aliphatic hydrocarbon having 19 to 30 carbon atoms.

8. A magnetic fluid according to claim 1 wherein the solvent is present in an amount of 50 to 300% of the metal fine particles on a weight basis.

9. A magnetic fluid according to claim 1, wherein the surface-active agent is an oil-soluble anionic sulfosuccinate surface-active agent.

10. A magnetic fluid according to claim 1, wherein the surface-active agent is a nonionic surface-active agent which is a polyglycerine fatty acid ester or polyethylene glycol alkly ether.

11. A magnetic fluid according to claim 1 wherein the surface-active agent is present in an amount of 5 to 20% of the metal fine particles on a weight basis.

12. A magentic fluid comprising metal fine particles of cobalt, a surface-active agent, and a medium,
the improvement wherein said surface-active agent comprises at least one member selected from nonionic and oil-soluble anionic surface-active agents and said medium comprises a low-volatile solvent and a low-boiling solvent.

13. A magnetic fluid according to claim 12 wherein the low-boiling solvent has a boiling point of 100° to 160° C.

14. A magnetic fluid according to claim 12 or 13 wherein the low-boiling solvent is a hydrocarbon medium having 7 to 22 carbon atoms.

15. A magnetic fluid according to claim 14 wherein the low-boiling hydrocarbon solvent is present in an amount of at least 5% of the metal fine particles on a weight basis.

16. A magnetic fluid according to claim 1 or 12 which further comprises an effective amount of an antioxidant.

17. A magnetic fluid according to claim 16 wherein the antioxidant is tocopherol.

18. A magnetic fluid according to claim 16 wherein the antioxidant is present in an amount of 0.8 to 10% by weight of the weight of the metal fine particles.

19. A process for preparing a magnetic fluid comprising metal fine particles of cobalt, a surface-active agent, and a medium, comprising the steps of:
preparing a dispersion comprising metal fine particles of cobalt, a surface-active agent and a low-boiling solvent; and
replacing all or a part of the low-boiling solvent by a low-volatile solvent having a nonionic or oil-soluble anionic surface-active agent dissolved therein.

* * * * *